United States Patent
Zhang

(10) Patent No.: US 6,922,560 B1
(45) Date of Patent: Jul. 26, 2005

(54) METHOD AND SYSTEM FOR ANTENNA VERIFICATION FOR CLOSED LOOP TRANSMIT DIVERSITY

(75) Inventor: Tao Zhang, Fremont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 468 days.

(21) Appl. No.: 10/225,270

(22) Filed: Aug. 20, 2002

(51) Int. Cl.[7] .............................................. H04Q 7/20
(52) U.S. Cl. .................... 455/423; 455/67.11; 455/101; 370/326; 370/334; 370/335; 370/342; 370/343; 370/345
(58) Field of Search .............................. 455/423, 67.11, 455/561–562.1, 115.1–115.4, 126, 137, 193.1, 226.1–226.4, 69, 101; 370/310, 320–321, 326, 334, 333, 335, 342–345

(56) References Cited

U.S. PATENT DOCUMENTS

| 6,754,473 | B1 | * | 6/2004 | Choi et al. .................. 455/101 |
| 2002/0086707 | A1 | * | 7/2002 | Struhsaker et al. ......... 455/561 |
| 2002/0131381 | A1 | * | 9/2002 | Kim et al. ................... 370/335 |
| 2003/0138030 | A1 | * | 7/2003 | Gavnoudias et al. ........ 375/141 |
| 2003/0142755 | A1 | * | 7/2003 | Chi et al. .................... 375/265 |
| 2003/0171139 | A1 | * | 9/2003 | Sarresh et al. .............. 455/562 |

* cited by examiner

Primary Examiner—Duc Nguyen

(57) ABSTRACT

A method and system for implementing antenna verification in a closed loop transmit diversity system. The method includes the step of processing a received signal using a finger processors to generate a plurality of finger outputs. The mobile station is communicatively coupled to a base station. The method also includes the step of combining each of the finger outputs using a combiner to produce a plurality of intermediate results. The intermediate results are obtained prior to a final summation performed by the combiner. An antenna verification process is performed using the intermediate results, the intermediate results in the pre-slot FSM (feedback signaling message) calculation from an FSM encoder, and the pre-slot FSM from the FSM encoder to efficiently estimate the error of the FSM signal and obtain the correct channel estimation by keeping the weight factors generated in a mobile station and used in a base station consistent with each other, thereby reducing the effects of FSM error between the base station and the mobile station.

20 Claims, 4 Drawing Sheets

METHOD AND SYSTEM FOR ANTENNA VERIFICATION FOR CLOSED LOOP TRANSMIT DIVERSITY

TECHNICAL FIELD

The present invention relates to the field of wireless communications. More particularly, the present invention relates to wireless antenna transmission and reception for use with cellular telephone systems.

BACKGROUND ART

The field of wireless data communications represents one of the most rapidly evolving technologies in wide spread use today. Data communications and data processing has become important to virtually every segment of the nation's economy. The demand for efficient and reliable data transmission systems has increased the requirement for the control of errors to enable the reliable reproduction of data.

Information needs to be reliably transmitted and received. This holds true for data communications as well as voice communications. Wireless transmission systems transmit data from a transmitter to a receiver through a communications channel. The communications channel is typically an over the air, RF transmission. Examples include cellular telephony applications, two way radio communications, wireless Ethernet, and the like. Transmission conditions, that is, the degree to which RF signals are distorted by various conditions of the communications channel (e.g., weather, multi-path interference, multiple transmitter interference, etc.) are often problematic. A primary measure of the effectiveness of a wireless communications system is its reliability and performance irrespective of transmission conditions. Reliable transmission should be ensured even in the presence of significant interference, noise, or other problems with the communications channel.

One method for ensuring reliable transmission is to utilize efficient error control and correction techniques (ECC). Modern ECC processes are primarily implemented through error correction code schemes. Error control coding as implemented between a transmitting device and a receiving device incorporates information into a transmitted digital data stream (e.g., a signal) that allows the receiver to find and correct bit errors occurring in transmission and/or storage. Since such coding detects or corrects errors incurred in the communication, it is often referred to as channel coding. The transmitting side of the error-control coding adds redundant bits or symbols to the original signal sequence and the receiving side uses these bits or symbols to detect and/or correct any errors that occurred during transmission. In general the more redundant bits added to the transmitted sequence the more errors that can be detected and more redundancy is required for detection and correction than for detection alone. However, there exists several practical limits to the degree to which an efficient ECC scheme can compensate for problems with the communications channel.

Another method for ensuring reliable transmission is the use of sophisticated noise cancellation and/or filtering processes. Many of these processes utilize sophisticated signal processing schemes to enhance the receiver's ability to filter out the effects of noise within the communications channel.

One such scheme involves the use of multiple transmitter antennas to transmit RF signals to receivers through a given communications channel. Each antenna transmits a version of the outgoing signal in order to cancel out the effects of fading, wherein one version may experience more fading than another version (e.g., due to multipath effects, etc.). This method is generally referred to as transmit diversity.

Transmit diversity can operate using closed loop or open loop methods. Open loop transmit diversity does not use any feedback from receivers to alter signals transmitted from the station. Closed loop transmit diversity utilizes feedback signals from the receivers to alter the versions of the outgoing signal (e.g., from the multiple antennas).

In general, closed loop mode transmit diversity is a well known technique for countering the effects of signal fading. In closed loop mode transmit diversity, to maximize the power of the transmitted signal (e.g., a DPCH signal) received at antenna of mobile station, the antenna weights at base station are generated based on FSM (Feedback Signaling Message) transmitted from mobile station. Since FSM is not protected by any ECC scheme, the bit error rate in the uplink of the FSM bits could be very high.

FSM error causes downlink performance degradation in at least two ways. Due to the FSM error, generated antenna weights at the base station will no longer be at the optimal setting. Received DPCH signals at the mobile station consequently suffer from power loss. And in the mobile station receiver, if the restored antenna weights are different from the real settings in the base station, additional performance degradation will be introduced.

In the mobile station, to demodulate the received DPCH signal correctly, channel characteristics of the DPCH signals (including antenna weights in base station) are required. There are two approaches to get the channel characteristics, one is to estimate it directly by the dedicated pilot symbols in DPCH, and another is combining the channel estimation of CPICH and antenna weights restored at mobile station. Usually the later approach with antenna verification is adopted. Furthermore, antenna verification mitigates the additional performance degradation caused by FSM error. With the former approach, the additional performance degradation can be avoided. However, the total performance is worse than the later one, since in low downlink data rate, the power of CPICH is much high than that of DPCH; in high data rate, the ratio of pilot symbols to total symbols transmitted in one slot is much smaller.

This has the effect of significantly reducing the overall system's ability to operate in the presence of noise and interference. Because feedback information regarding the transmission characteristics of the communications channel between the transmitter and the mobile station is corrupted (e.g., excessive bit error rate), the closed loop correcting process of the antenna weights cannot properly compensate for interference and/or noise.

Thus, what is required is an antenna verification method that can reduce the effects of downlink performance degradation in a closed loop transmit diversity communications system. The required solution should efficiently reduce the effects of FSM error between a transmitter and a mobile station. The present invention provides a novel solution to the above requirements.

SUMMARY OF THE INVENTION

The present invention is a method and system for implementing antenna verification in a closed loop transmit diversity system. Embodiments of the present invention provide an antenna verification method that can reduce the effects of downlink performance degradation in a closed loop transmit diversity communications system. Additionally, embodiments of the present invention efficiently estimate the error of the FSM signal and obtain the correct channel estimation by keeping the weight factors generated in a mobile station and used in a base station consistent with each other, thereby reducing the effects of FSM error between the base station and the mobile station.

In one embodiment, the present invention is implemented as a method for implementing antenna verification in a closed loop transmit diversity system, as used in, for example, a WCDMA (wide band code division multiple access) system. The method includes the step of receiving a signal from a base station, wherein the signal was transmitted from the base station using multiple transmit antennas. The received signal is processed using finger processors in the mobile station to produce a plurality of finger outputs. The finger outputs are processed using the FSM encoder to generate an FSM signal and send the FSM signal to the base station by an uplink. The finger outputs are combined in a combiner to produce a plurality of intermediate results and a final data output. An antenna verification process is then performed using the intermediate results from the combiner and the intermediate results in the pre-slot FSM calculation from the FSM encoder and the pre-slot FSM to estimate the weight factors of the two transmit antennas of the base station. Then, the combiner is used to perform a final summation of the combiner intermediate results, the pre-slot FSM intermediate results, and the estimated antenna weight factors to produce a data output.

In one embodiment, the combiner can be implemented as three summing units, wherein a first and second summing unit are used to combine the finger outputs of the received signal from the first transmit antenna and the second transmit antenna and to produce the intermediate result (e.g., used in the antenna verification process). The third summing unit is used to combine the outputs of the first and second units with estimated weight factors to produce a data output.

BRIEF DESCRIPTION OF THE DRAWINGS

The present invention is illustrated by way of example and not by way of limitation, in the Figures of the accompanying drawings and in which like reference numerals refer to similar elements and in which.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention is a method and system for implementing antenna verification in a closed loop transmit diversity system. Embodiments of the present invention provide an antenna verification method that can reduce the effects of downlink performance degradation in a closed loop transmit diversity communications system. Additionally, embodiments of the present invention efficiently estimate the error of the FSM signal and obtain the correct channel estimation by keeping the weight factors generated in a mobile station and used in a base station consistent with each other, thereby reducing the effects of FSM error between the base station and the mobile station.

Figure 1:
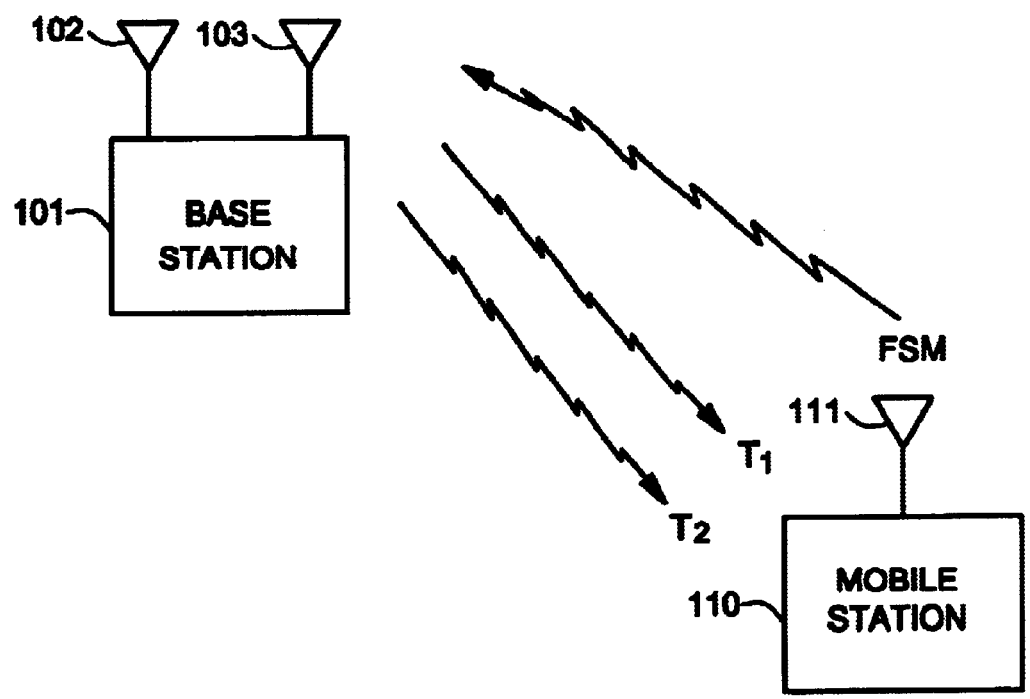
FIG. 1 shows a closed loop transmit diversity system in accordance with one embodiment of the present invention.

FIG. 1 shows a closed loop transmit diversity system 100 in accordance with one embodiment of the present invention. As depicted in FIG. 1, system 100 includes a base station 101 communicatively coupled to a mobile station 110. The base station includes first and second antennas 102 and 103. The mobile station includes an antenna 111.

System 100 of the present embodiment implements a closed loop transmit diversity system. As is well known, closed loop transmit diversity in cellular telephone applications involves the use of multiple transmitter antennas (e.g., antennas 102 and 103) to transmit RF signals to mobile station receivers (e.g., mobile station 110) within a given cell. Each of the antennas 102 and 103 transmits a version of the outgoing signal such that the mobile station 110 can analyze the phase relationship between the received versions and cancel out interference (e.g., due to multipath, fading, etc.).

System 100 of the present embodiment operates in a closed loop mode. Transmit diversity can operate in closed loop or open loop methods. As its name implies, open loop transmit diversity does not use any feedback from receivers to alter signals transmitted from the station. Closed loop transmit diversity utilizes feedback signals from the receivers to alter the versions of the outgoing signal (e.g., from the multiple antennas). As shown in FIG. 1, the two versions of the transmit signal (e.g., $T_1$ and $T_2$) are transmitted from the antennas 102 and 103. The feedback signal (e.g., FSM) is transmitted back from the mobile station 110 via the antenna 111. The feedback signal is used by the base station to adjust the phase relationships between the two versions of the transmit signal to cancel out the effects of interference and/or noise in the communications channel. Embodiments of the present invention efficiently reduce the effects of error on the FSM signal between the base station 101 and the mobile station 110.

Figure 2A:
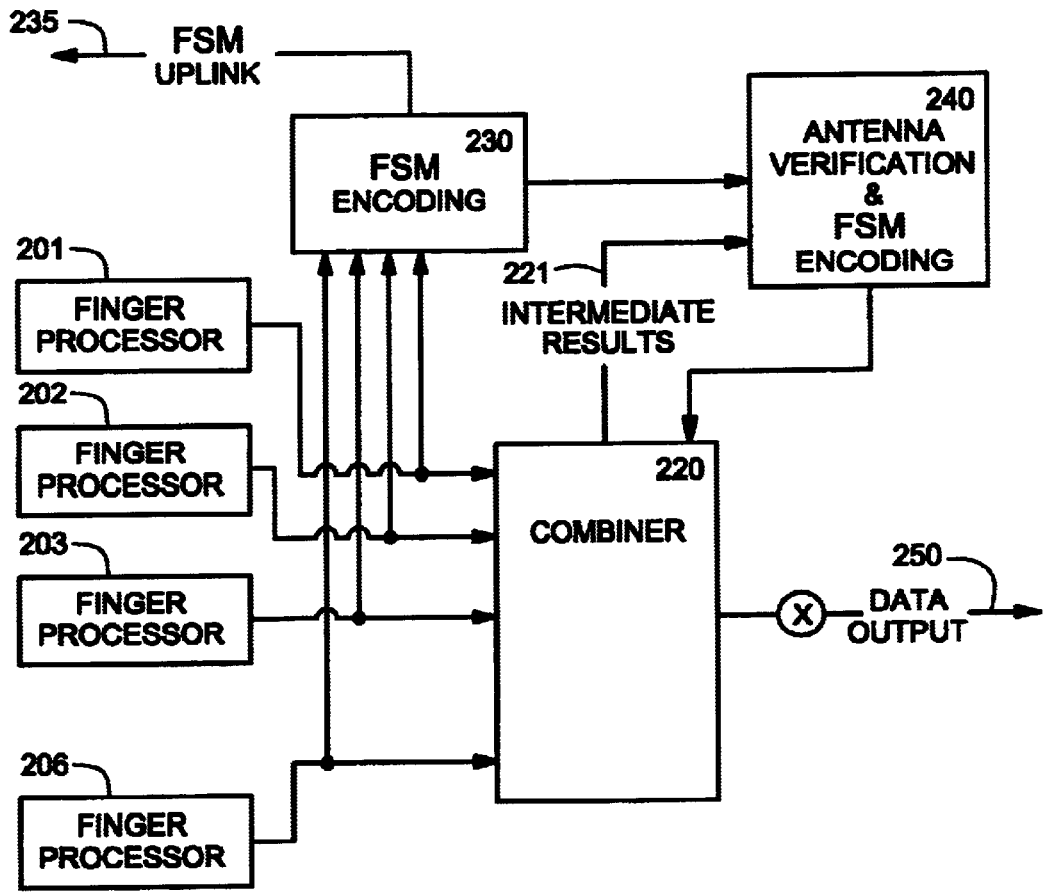
FIG. 2A shows a generalized overview block diagram of the internal components of the mobile station in accordance with one embodiment of the present invention.

FIG. 2A shows a generalized overview block diagram of the internal components of the mobile station 110 in accordance with one embodiment of the present invention. As depicted in FIG. 2A, the mobile station 110 includes the components 201–250 for implementing closed loop transmit diversity. It should be noted that the components 201–250 are shown for purposes of illustrating certain aspects of the present invention. Accordingly, many components of the mobile station 110 are not depicted exhaustively in order to avoid unnecessarily obscuring the aspects of the present invention.

The mobile station 110 embodiment shown in FIG. 2A shows the general components required for implementing antenna verification in a closed loop transmit diversity system. The mobile station 110 includes finger processors 201–206 for processing a received signal (e.g., $T_1$ and $T_2$) to generate a plurality of finger outputs. The outputs of the finger processors 201–206 are then combined by a combiner 220 to produce both a plurality of intermediate results 221 and the final data output 250. An antenna verification unit 240 is coupled to the combiner 220 and the FSM encoder 230 and is configured for performing an antenna verification process using the intermediate results from the combiner 220 and the intermediate results in the pre-slot FSM calculation from the FSM encoder 230 and the pre-slot FSM to estimate the weight factors of the two transmit antennas of the base station. An FSM signal output 235 is configured for transmitting the FSM signal to the base station 101 communicatively coupled to the mobile station 110. The intermediate results 221 are also processed by the combiner 220, where they undergo a final summation process and, combined with information generated by the antenna verification unit 240, produce the data output 250.

Figure 3:
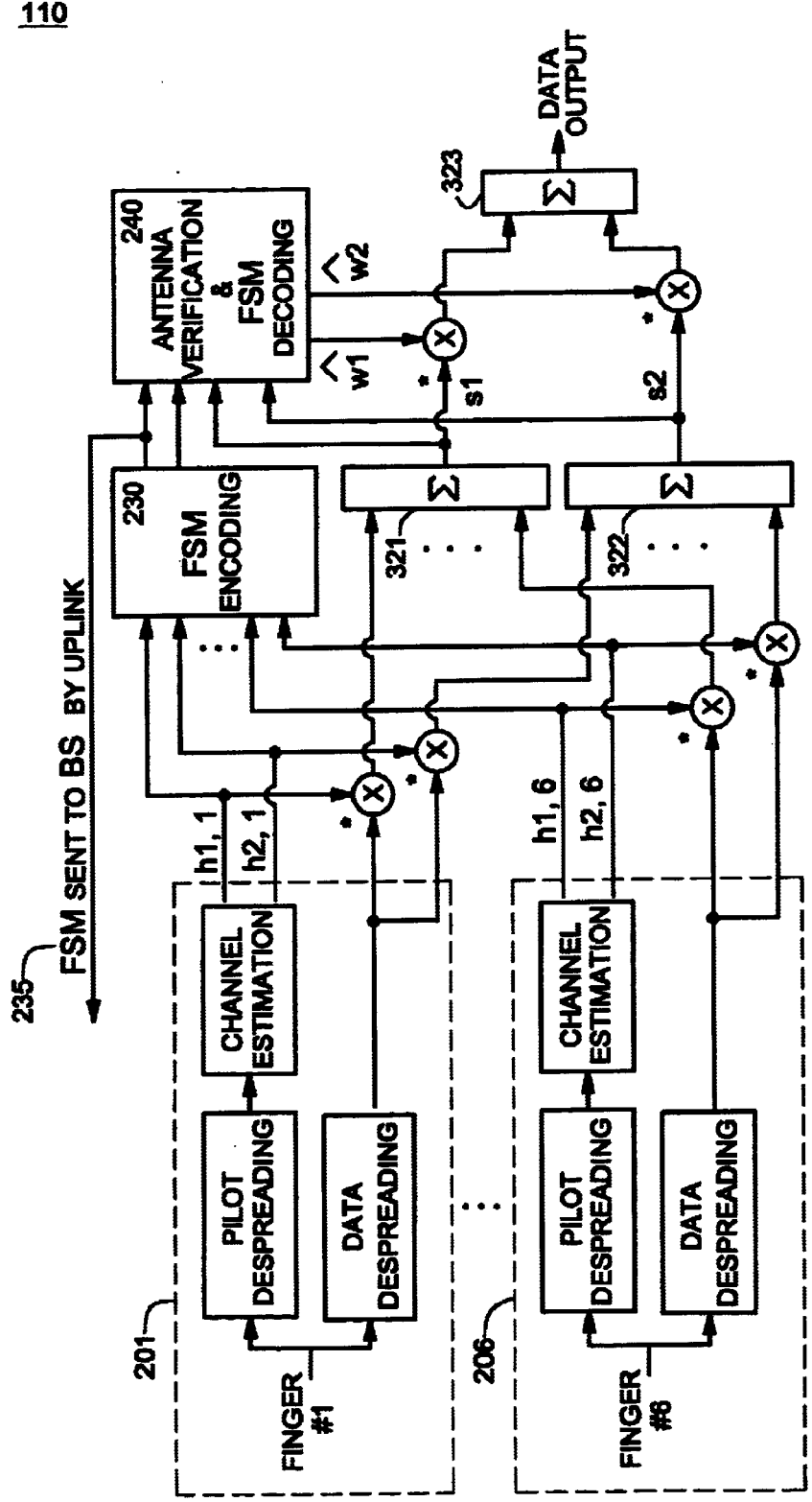
FIG. 3 shows a more detailed diagram of the components of the mobile station in accordance with one embodiment of the present invention.

Referring still to FIG. 2A, a plurality of respective finger processors 201–206 can be included for dispreading of the data channel, the pilot channel, and performing channel estimation. In this embodiment, four finger processors are shown, however, it should be noted that depending upon the particular requirements of the rake receiver, many different numbers of finger processors can be implemented (e.g., typically 6). Each of the finger processors 201–206 can include a pilot despreading unit, a data despreading unit, and a channel estimation unit, as shown in FIG. 3 below. The intermediate results 221 can be obtained for the antenna verification process by accessing the combiner 220 prior to a final summation operation performed by the combiner 220.

Figure 2B:
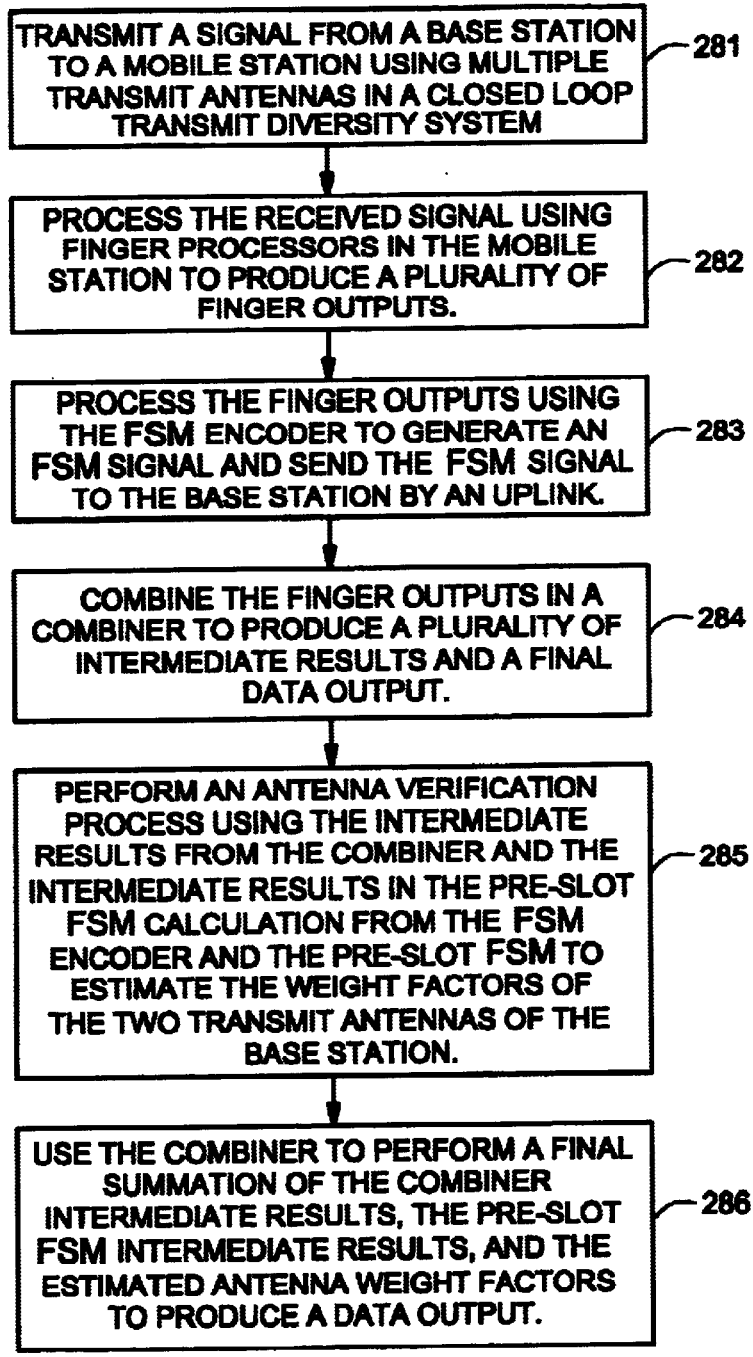
FIG. 2B shows a flow chart of the steps of an antenna verification process as implemented between a base station and a mobile station.

FIG. 2B shows a flow chart of the steps of an antenna verification process 280 as implemented between a base station and a mobile station. Process 280 shows the operating steps of a base station (e.g., base station 101) as it transmits from multiple antennas (e.g., transmit antennas 102 and 103) to a mobile station (e.g., mobile station 110).

Process 280 begins in step 281, where the base station 101 transmits a signal to the mobile station 110 using multiple transmit antennas 102–103. As described above, the multiple antennas 102–103 transmit different versions of the outgoing signal (e.g., different weights, etc.) to assist the mobile station 110 in filtering out interference. In step 282, the received signal is processed using finger processors in the mobile station to produce a plurality of finger outputs. In step 283, the finger outputs are processed using the FSM encoder to generate an FSM signal and send the FSM signal to the base station by an uplink. In step 284, the finger outputs are combined in a combiner to produce a plurality of intermediate results and a final data output. In step 285, an antenna verification process is performed using the intermediate results from the combiner and the intermediate results in the pre-slot FSM calculation from the FSM encoder and the pre-slot FSM to estimate the weight factors of the two transmit antennas of the base station. In step 286, the combiner used to perform a final summation of the combiner intermediate results, the pre-slot FSM intermediate results, and the estimated antenna weight factors to produce a data output.

FIG. 3 shows a more detailed diagram of the components of the mobile station 110 in accordance with one embodiment of the present invention. As depicted in FIG. 3, a first finger processor 201 and a sixth finger processor 206 are shown. As described above, each finger processor 201–206 includes a pilot despreading unit, a data despreading unit, and a channel estimation unit. Separate combiners 321–323 are shown for combining the intermediate results produced by the finger processors 201–206.

FIG. 3 also shows three summing units 321, 322, and 323. Summing unit 321 combines the signals from the finger processors for the first transmit antenna of the base station. Summing unit 322 combines the signals from the finger processors for the second transmit antenna of the base station. Summing unit 323 performs the final summation of the outputs of the units 321 and 322, and the estimated weight factors from the antenna verification unit 240.

Referring still to FIG. 3, a qualitative and quantitative description of the principles of operation of the mobile station 110 in accordance with one embodiment of the present invention of follows.

In accordance with embodiments of the present invention, in antenna verification, the BER (bit error rate) of FSM information feedback from mobile station 110 to base station 101 can be assumed to be 4%. The maximum a posteriori probability (MAP) detection algorithm is adopted. By a MAP detection algorithm and Bayes law, the estimated hypothesis is given as:

$$\tilde{H} = \arg\max_{Hi \in H0, H1} f(x, y \mid Hi) \qquad (1)$$

f(x,y/Hi), i=0, 1, is probability density function of received signal (x,y) given hypothesis Hi. P(Hi) is the probability of hypothesis Hi is true. Hereafter, H0 is the hypothesis of correct weight settings in base station and H1 is the hypothesis of wrong setting.

In the present algorithm design, the Gaussian distributed signal is assumed. For 2-dimension Gaussian distribution probability density function with variance $\sigma_x^2$, $\sigma_y^2$ and mean $x_m$, $y_m$ is:

$$f(x, y) = \frac{1}{2\pi\sigma_x\sigma_y}\exp\left(-\frac{(x-x_m)^2}{\sigma_x^2} - \frac{(y-y_m)^2}{\sigma_y^2}\right) \qquad (2)$$

assume $\sigma_x^2 = \sigma_y^2 = \sigma^2$, and bring equation (2) to (1), the wrong weight setting judgement criterion:

$$(x-x0)^2 + (y-y0)^2 - (x-x1)^2 - (y-y1)^2 \geq 2\sigma^2 \ln\frac{P(H0)}{P(H1)} \qquad (3)$$

In the present embodiment, if inequality (3) holds, then weights in base station are judged to be wrong. Otherwise, weights are judged to be correct. To apply above inequality in antenna verification, the suitable tested signal x, y including weights information need to be found and their mean value x0, y0 under hypothesis H0 and x1, y1 under hypothesis H1 need to be derived.

As known by those skilled in the art, antenna verification can be implemented with different algorithms. In the present embodiment, an algorithm is implemented wherein the algorithm makes use of the intermediate results of an MRC Rake receiver, which dramatically reduces the computation complexity.

As known by those skilled in the art, in a Rake receiver, the dispreading output of the l-th finger for n-th symbol belonging to k-th slot can be written as:

$$r_l(n,k) = d1(n,k)w1(k)h1_l(n,k) + d2(n,k)w2(k)h2_l(n,k) + n_{rl}(n,k) \qquad (4)$$

d1(n,k) and d2(n,k) are complex symbols sent from antenna 1 and antenna 2 respectively (e.g., antenna 102 and antenna 103). If Npilot and Nslot stand for the numbers of complex pilot symbols and total complex symbols in a slot respectively, when n=0~Nslot-Npilot-1, d1(n,k)=d2(n,k)=d(n,k); when n=Nslot-Npilot~Nslot, d1(n,k) and d2(n,k) are orthogonal in closed loop mode 1 and are same in closed loop mode 2. h1$_l$(n,k) and h2$_l$(n,k) are l-th path DPCH channel responses of antenna 1 and 2 respectively (e.g., antenna 102 and antenna 103). $n_{rl}$(n,k) is complex-valued zero-mean white Gaussian noise process. w1(k) and w2(k) are antenna weights in the base station 101.

Referring still to FIG. 3, in the present embodiment, the MRC operations in a closed loop transmit diversity case can be divided into 2 stages as shown in FIG. 3. In the first stage, MRC combining for 2 antenna's signal are combined separately.

$$s1(n, k) = \sum_{l=1}^{L} r_l(n, k) h1_l^{p^*}(n, k) \quad (5)$$

$$s2(n, k) = \sum_{l=1}^{L} r_l(n, k) h2_l^{p^*}(n, k) \quad (6)$$

where, L is the number of fingers in Rake Receiver, $h1_l^{p^*}$(n,k) and $h2_l^{p^*}$(n,k) are conjugated channel estimations taken from primary CPICH. They have following relationship with $h1_l^{p^*}$(n,k) and $h2_l^{p^*}$(n,k), the conjugated channel responses of DPCH.

$$h1_l^{p^*}(n,k) = p(k) h1_l^*(n,k) + n_{h1}(n,k) \quad (7)$$

$$h2_l^{p^*}(n,k) = p(k) h2_l^*(n,k) + n_{h1}(n,k) \quad (8)$$

where p(k) is a real factor to represent the power difference transmitted power of CPICH and DPCH. This factor also relates to the different processing gains in demodulating the CPICH and DPCH channels.

Bringing equations (7) and (8) to (5) and (6), the following equations (9) and (10) are obtained:

$$s1(n, k) = p(k) d1(n, k) w1(k) \sum_{l=1}^{L} |h1_l(n, k)|^2 + \quad (9)$$

$$p(k) d2(n, k) w2(k) \sum_{l=1}^{L} h1_l^*(n, k) h2_l(n, k) +$$

$$n_{s1}(n, k)$$

$$s2(n, k) = p(k) d1(n, k) w1(k) \sum_{l=1}^{L} h1_l(n, k) h2_l^*(n, k) + \quad (10)$$

$$p(k) d2(n, k) w2(n) \sum_{l=1}^{L} |h2_l(n, k)|^2 +$$

$$n_{s2}(n, k)$$

In the present embodiment, these intermediate results are used in data demodulation, SIR measurement, synchronization detection and antenna verification.

Referring still to FIG. 3, as known by those skilled in the art, antenna verification can be performed in closed loop mode 1 or closed loop mode 2.

In the present embodiment, in closed loop mode 1, $$w1(k) = 1/\sqrt{2} \quad (11)$$

$$w2(k) = \frac{\sum_{i=k-1}^{k} \cos(\phi_i)}{2} + j \frac{\sum_{i=k-1}^{k} \sin(\phi_i)}{2} \text{ where} \quad (12)$$

$$\phi_k \in \{0, \pi\} \quad k\%2 = 0 \quad (13)$$
$$\phi_k \in \{-\pi/2, \pi/2\} \quad k\%2 = 1$$

Due to the 2-slot filtering in phase setting described in equation (12), the FSM error happened in one slot will cause the wrong weights in 2 consecutive slots. In mobile station, it is possible to make the judgment based on 2 slots information. It has the better performance comparing with the judgment based on only one slot information. However judgment based on 2 slots information may cause one slot delay in data demodulation. And because of the discontinuity of filter at frame boundary, matched filter many increase complexity also. Therefore 2-slot method is preferably not adopted.

For antenna verification for closed loop mode 1, tested signal x(k) and y(k) is calculated with the following equation:

$$x(k) + jy(k) = \frac{1}{N_{pilot}} \sum_{n=Nslot-Npilot}^{Nslot-1} s2(n, k) d2^*(n, k) \quad (14)$$

substitute S2(n,k) with equation (10) and because:

$$\sum_{n=Nslot-Npilot}^{Nslot-1} d1(n, k) d2^*(n, k) = 0 \quad (15)$$

We can obtain that:

$$x(k) + jy(k) = \frac{1}{N_{pilot}} \sum_{n=Nslot-Npilot}^{Nslot-1} s2(n, k) d2^*(n, k) \quad (16)$$

$$= \frac{1}{N_{pilot}} p(k) |d2(k)|^2 \sum_{l=1}^{L} |h2_l(n, k)|^2 w2(k) +$$

$$n_A(n, k)$$

Seen from this equation, x(k) and y(k) reflects the setting of w2(k) at base station and it can be used for MAP estimation.

To apply MAP algorithm equation (3), value x0(k), y0(k) and x1(k), y1(k) still need to be Figured out.

$$x0(k) + jy0(k) = \frac{1}{N_{pilot}} p(k) |d2(k)|^2 \sum_{l=1}^{L} |h2_l(n, k)|^2 \hat{w}2(k) \quad (17)$$

$$x1(k) + jy1(k) = \frac{1}{N_{pilot}} p(k) |d2(k)|^2 \sum_{l=1}^{L} |h2_l(n, k)|^2 \hat{w}2'(k) \quad (18)$$

$\hat{w}2(k)$ is locally generated correct w2(k) setting, and $\hat{w}2'(k)$ is locally generated wrong w2(k) setting.

According to the setting of w2(k) in base station, in the even slots, the wrong FSM bit will only cause the wrong sign bit of real part of w2(k). In the odd slots, the wrong FSM bit will only case the wrong sign bit of imaginary part of w2(k).

Accordingly, in even slots, the following relationships hold:

$$x1(k)=-x0(k) \quad (19)$$

$$y1(k)=y0(k) \quad (20)$$

The wrong setting judgement criterion (3) can be simplified to:

$$-2x(k)x0(k) \geq \sigma_x^2 \ln \frac{P(H0)}{P(H1)} \quad (21)$$

x0(k) is obtained by:

$$x0(k)=\tilde{x}(k)\text{sign}(Re(\hat{w}2(k))) \quad (22)$$

$\tilde{x}(k)$ is short time estimation of $|x(k)|$, and it is estimated by $$\tilde{x}(k)=\alpha\tilde{x}(k-1)+(1-\alpha)|x(k)| \quad (23)$$

$\sigma_x^2(k)$ is estimated by $$\sigma_x^2(k)=\alpha'\sigma_x^2(k-1)+(1-\alpha')[|x(k-1)|-\tilde{x}(k-1)]^2 \quad (24)$$

$\alpha$ and $\alpha'$ are coefficients in filters (23) and (23).
In odd slots, following relationships hold:

$$x1(k)=x0(k) \quad (25)$$

$$y1(k)=-y0(k) \quad (26)$$

The wrong setting judgement criterion (3) can be simplified to:

$$-2y(k)y0(k) \geq \sigma_y^2 \ln \frac{P(H0)}{P(H1)} \quad (27)$$

y0(k) is obtained by:

$$y0(k)=\tilde{y}(k)\text{sign}(Im(\hat{w}2(k))) \quad (28)$$

$\tilde{y}(k)$ is short time estimation of $|y(k)|$, and it is estimated by $$\tilde{y}(k)=\alpha\tilde{y}(k-1)+(1-\alpha)|y(k)| \quad (29)$$

$\sigma_y^2(k)$ is estimated by $$\sigma_y^2(k)=\alpha'\sigma_y^2(k-1)+(1-\alpha')[|y(k-1)|-\tilde{y}(k-1)]^2 \quad (30)$$

Referring still to FIG. 3, in an antenna verification algorithm for closed loop mode 2 in accordance with the present invention, either s1(n,k) or s2(n,k) includes w1(k) and w2(k) information, and can be used in antenna verification. However using s2(n,k) gives better performance. When s2(n,k) is used, $$x(k)+jy(k) = \frac{1}{N_{pilot}}\sum_{n=Nslot-Npilot}^{Nslot-1} s2(n,k)d^*(n,k) \quad (31)$$

$$x(k)+jy(k) = \quad (32)$$
$$p(k)|d(k)|^2\left[w1(k)\sum_l^L h1(k)h2^*(k)+w2(k)\sum_l^L|h2(k)|^2\right]+n_{xy}$$

and $$x0(k)+jy0(k) = p(k)|d(k)|^2\left[\hat{w}1(k)\sum_l^L h1(k)h2^*(k)+\hat{w}2(k)\sum_l^L|h2(k)|^2\right] \quad (33)$$

To easily utilize intermediate results $$\sum_l^L|h2^p(k)|^2 \text{ and } \sum_l^L h1^p(k)h2^{p^*}(k)]$$

from FSM encoding, above expression can be written as:

$$x0(k)+jy0(k) = c(k)\left[\hat{w}1(k)\sum_l^L h1^p(k)h2^{p^*}(k)+\hat{w}2(k)\sum_l^L|h2^p(k)|^2\right] \quad (34)$$

x1(k) and y1(k) can be calculated with $$x1(k)+jy1(k) = c(k)\left[\hat{w}1'(k)\sum_l^L h1^p(k)h2^{p^*}(k)+\hat{w}2'(k)\sum_l^L|h2^p(k)|^2\right] \quad (35)$$

if we note $$tx(k)+jty(k) = \hat{w}1(k)\sum_l^L h1^p(k)h2^{p^*}(k)+\hat{w}2(k)\sum_l^L|h2^p(k)|^2 \quad (36)$$

then c(k) is estimated by:

$$c(k)=\alpha''c(k-1)+(1\alpha'')(|x(k)|+|y(k)|)/(|tx(k)|+|ty(k)|) \quad (37)$$

where $\alpha''$ are coefficient in filter (40)
if $\tilde{H}(k)=H0(k)$, $\sigma^2(k)$, is estimated by $$\sigma^2(k)=\alpha\sigma^2(k-1)+(1\alpha)\{[(x(k)-x0(k)]^2+[(y(k)-y0(k)]^2\}/2 \quad (38)$$

if $\tilde{H}(k)=H1(k)$, $\sigma^2(k)$ is estimated by $$\sigma^2(k)=\alpha\sigma^2(k-1)+(1\alpha)\{[(x(k)-x1(k)]^2+[(y(k)-y1(k)]^2\}/2 \quad (39)$$

Thus, embodiments of the present invention provide a method and system for implementing antenna verification in a closed loop transmit diversity system. Embodiments of the present invention provide an antenna verification method that can reduce the effects of downlink performance degradation in a closed loop transmit diversity communications system. Additionally, embodiments of the present invention efficiently estimate the error of the FSM signal and obtain the correct channel estimation by keeping the weight factors generated in a mobile station and used in a base station consistent with each other, thereby reducing the effects of FSM error between the base station and the mobile station.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a mobile station, a method for implementing antenna verification in a closed loop transmit diversity system comprising:

processing a received signal using a finger processor to generate a plurality of finger outputs;

combining each of the finger outputs using a combiner to produce a plurality of intermediate results;

performing an antenna verification process using the intermediate results to reduce an effect of a bit error rate of an FSM (feedback signaling message) signal; and transmitting the FSM signal to a base station communicatively coupled to the mobile station.

2. The method of claim 1 further comprising:

producing the FSM signal using an FSM encoder coupled to receive the finger outputs.

3. The method of claim 2 wherein intermediate results in a pre-slot FSM calculation and a pre-slot FSM are used with the intermediate results from the combiner to perform the antenna verification process.

4. The method of claim 1 wherein the intermediate results are obtained for the antenna verification process by accessing the combiner prior to a final summation operation performed by the combiner.

5. The method of claim 1 wherein the using of the intermediate results for the antenna verification process is configured for a reduced computation complexity.

6. A system for implementing antenna verification in a closed loop transmit diversity system in a mobile station, comprising:

a plurality of finger processors for processing a received signal to generate a plurality of finger outputs;

a combiner for receiving each of the finger outputs generated by the finger processors and producing a plurality of intermediate results;

an antenna verification unit coupled to the combiner and an FSM encoder, the antenna verification unit configured for performing an antenna verification process using the intermediate results from the combiner; and an FSM signal output configured for transmitting the FSM signal to a base station communicatively coupled to the mobile station.

7. The system of claim 6 further comprising:

a plurality of respective finger processors configured for despreading a data channel, a pilot channel and performing channel estimation.

8. The system of claim 7 wherein intermediate results in a pre-slot FSM calculation and a pre-slot FSM are used with the intermediate results from the combiner to perform the antenna verification process.

9. The system of claim 6 wherein the intermediate results are obtained for the antenna verification process by accessing the combiner prior to a final summation operation performed by the combiner.

10. The system of claim 6 wherein the antenna verification unit is configured to use the intermediate results for the antenna verification process for a reduced computation complexity.

11. A mobile station system for implementing antenna verification in a closed loop transmit diversity scheme comprising:

means for processing a received signal using a plurality of finger processors to generate a plurality of finger outputs;

means for combining each of the finger outputs generated by the finger processors to produce a plurality of intermediate results;

means for performing an antenna verification process using the intermediate results from the combiner; and means for transmitting a FSM signal to a base station communicatively coupled to the mobile station.

12. The mobile station system of claim 11 further comprising:

means for producing the FSM signal using an FSM encoder coupled to receive the finger outputs.

13. The mobile station system of claim 12 wherein the FSM signal is used with the intermediate results to perform the antenna verification process.

14. The mobile station system of claim 11 wherein the intermediate results are obtained for the antenna verification process by accessing the combiner prior to a final summation operation performed by the combiner.

15. The mobile station system of claim 11 wherein the using of the intermediate results for the antenna verification process is configured for a reduced computation complexity.

16. An antenna verification unit for implementing antenna verification in a closed loop transmit diversity system, the antenna verification unit coupled to receive a plurality of a intermediate results from a combiner, wherein a plurality of finger outputs are combined using the combiner to produce the intermediate results, the antenna verification unit configured for performing an antenna verification process using the intermediate results from the combiner, intermediate pre-slot FSM calculation results, and a pre-slot FSM.

17. The antenna verification unit of claim 16 wherein the antenna verification unit is configured to couple to a FSM encoder to obtain the intermediate pre-slot FSM results and the pre-slot FSM.

18. The antenna verification unit of claim 17 wherein each of the finger processors include a pilot despreading unit, a data despreading unit, and a channel estimation unit.

19. The antenna verification unit of claim 17 wherein more than two transmit antennas are used for a base station of the transmit diversity system.

20. The antenna verification unit of claim 16 wherein the combiner includes a first summing unit and a second summing unit to combine the finger outputs of a received signal from a first transmit antenna and a second transmit antenna to produce the intermediate result, and wherein a third summing unit is included to combine outputs of the first summing unit and second summing unit with estimated weight factors to produce a data output.

* * * * *